(12) United States Patent
Sienel et al.

(10) Patent No.: US 6,426,942 B1
(45) Date of Patent: Jul. 30, 2002

(54) DEVICE AND METHOD FOR ESTABLISHING A CALL CONNECTION

(75) Inventors: Jürgen Sienel, Leonberg; Dieter Kopp, Hemmingen, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/166,611

(22) Filed: Oct. 5, 1998

(30) Foreign Application Priority Data

Oct. 17, 1997 (DE) .......................................... 197 45 961

(51) Int. Cl.$^7$ .......................... H04L 12/66; G06F 11/00; H04M 11/00
(52) U.S. Cl. ..................... 370/235; 370/352; 370/356; 379/93.9
(58) Field of Search ................................ 370/229, 352, 370/353, 357, 360, 521, 235, 236, 354, 356; 704/500, 503; 375/240; 379/88.17, 93.01, 93.02, 93.05, 93.06, 93.09, 235, 236

(56) References Cited

U.S. PATENT DOCUMENTS

| | | | | |
|---|---|---|---|---|
| 4,903,260 A | * | 2/1990 | Boettle et al. | 370/353 |
| 5,220,564 A | * | 6/1993 | Tuch et al. | 370/338 |
| 5,608,786 A | * | 3/1997 | Gordon | 370/352 |
| 5,889,774 A | * | 3/1999 | Mirashrafi et al. | 370/352 |
| 6,091,722 A | * | 7/2000 | Russell et al. | 370/352 |

FOREIGN PATENT DOCUMENTS

| | | |
|---|---|---|
| DE | 3723363 | 1/1988 |
| EP | 0507522 | 10/1992 |
| WO | 9525407 | 9/1995 |

OTHER PUBLICATIONS

"Telefonieren über das Internet" by Dirk Reusch Funkschau 17/97, pp. 44–47.
"Jackpot Least Cost Routing" by Ulrich Pfaffenberger Funkschau 9/97, pp. 28–34.
"Digitales Vermittlungssystem EWSD", Telekom Unterrichtsblatter 46 2/1993, pp. 48–60.
"Dual Rate Speech Coder for Multimedia Communications Transmitting at 5/3 and 6/3 kbit/s" ITU–T Recommendation G.723.1 (3/96), pp. 1–27.
"Telefonieren per Internet—Raubzug oder Bereicherung?", W. Knetsch et al, *NTZ,* vol. 6, 1997, pp. 48–50.
"Das Internet und die Vermittlung im Kernetz", M. Levy, *Alcatel Telecom Rundschau,* 4 Quartal 1997, pp. 274–279.
"Die Computer–Connection", E. Hirschmugl, *Telecom Report* 15 (1992), vol. 2, pp. 77–79.

* cited by examiner

Primary Examiner—Alpus H. Hsu
Assistant Examiner—Afsar M. Qureshi

(57) ABSTRACT

Call connections by way of the Internet (internet telephony) are less expensive than ones by way of an open telephone network. However, no fixed transmission rates are guaranteed in the Internet, which can lead to losses in the quality of transmitted speech signals. A device (V) for establishing a call connection between two subscriber terminals (T1, T2) has a first interface (IF1) to a packet-switched data network (INET) and means (IP, KOMP) for establishing connections by way of the packet-switched data network (INET) as well as a second interface (IF2) to a connection-oriented telecommunication network (PSTN), in which a transmission channel with a predetermined transmission band width can be furnished. By means of a monitoring device (MON), the device (V) determines a current data throughput in the data network (INET). A control device (SW) of the device (V) compares the current data throughput with a predetermined threshold value and controls the establishment of connections in such a way that the call connection is established by way of the data network (INET) when the data throughput lies above the threshold value and is established by way of the telecommunication network (PSTN) when the data throughput lies below the threshold value.

10 Claims, 1 Drawing Sheet

DEVICE AND METHOD FOR ESTABLISHING A CALL CONNECTION

BACKGROUND OF THE INVENTION

1. Technical Field

The invention relates to a device for establishing a call connection, a subscriber terminal with such a device, a telecommunication system with such a device, and a method for establishing a call connection.

2. Discussion of Related Art

An article by Dirk Reusch, "Telefonieren über das Internet", [Telephoning via the Internet] Funkschau 17/95 pp. 44–47, describes how a packet-switched data network, namely the Internet, can be used for telephone calls and thereby for the establishment of a call connection between two subscriber terminals. To that end, speech is digitized, compressed, transmitted in packets by way of the Internet, and on the other end, is reconstituted, decompressed, and digital-analog converted. This type of telephony can save a considerable amount of telephone charges. Internet telephony gateways serve to connect the Internet to the conventional telephone network in order to thus produce a telephone call between an internet subscriber and a subscriber to the conventional telephone network. Telephony via the Internet, however, has the disadvantage of fluctuating transmission quality, since no fixed bit rate for data transmission is guaranteed on the Internet. This can lead to halting speech transmission, call pauses, or also call interruptions due to the exceeding of a time limit.

The article "Jackpot Least-Cost Routing" by Ulrich Pfaffenberger, which appears in Funkschau 9/97, pp. 28–34, describes a possibility for savings on telephone charges in calls to mobile radio subscribers. To this end, so-called connecting boxes are used, which determine whether a subscriber can be reached by way of a mobile radio network or by way of a fixed network. Both networks are connection-oriented telecommunication networks. The connecting box has a direct connection both to the fixed network and to various mobile radio networks and in conjunction with the phone number of the desired calling partner, selects which network is used to produce a connection. This method, which is called least-cost routing, has the disadvantage that it can only be used in calls to mobile radio subscribers.

SUMMARY OF INVENTION

The object of the invention is to produce a device for establishing a flexible call connection between subscriber terminals in which a significant impairment of speech quality does not occur. Another object of the invention is to disclose a method for establishing such a call connection.

One advantage of the invention is that with the current pricing policy of network providers, a cost savings is achieved in relation to phone calls in the conventional telephone network.

According to a first aspect of the invention, a device for establishing a call connection between at least two subscriber terminals, which has a first interface to a packet-switched data network and means for establishing connections by way of the packet-switched data network, is characterized by means of a second interface to a connection-oriented telecommunication network, in which a transmission channel with a set transmission band width can be furnished, a monitoring device for determining a current data throughput in the data network, a control device for comparing the current data throughput with a set threshold value and for controlling the establishment of connections in such a way that the call connection is established by way of the data network when the data throughput lies above the threshold value and is established by way of the telecommunication network when the data throughput lies below the threshold value.

According to a second aspect of the invention, a subscriber terminal in which two channels to a digital, connection-oriented communication network can be furnished in parallel, characterized in that it contains a device according to claim 1, that the first interface and the second interface are respectively connected to one of the two channels, and that a connection to a provider of the packet-switched data network can be furnished by way of the channel connected to the first interface.

According to a third aspect of the invention, a telecommunications system with a large number of connections for subscriber terminals, is characterized by means of a device according to claim 1.

According to a fourth aspect of the invention, a method for establishing a call connection from a calling subscriber terminal, which is connected to a device for establishing the call connection, to at least one called subscriber terminal, with the following steps:

connection of the calling subscriber terminal with a packet-switched data network by way of a first interface of the device, connection of the calling subscriber terminal to a connection-oriented telecommunication network, in which a transmission channel with a predetermined transmission band width can be furnished, by way of a second interface of the device, determination of a current data throughput in the packet-switched data network, comparison of the current data throughput with a predetermined threshold value, and control of the establishment of connections in such a way that the call connection is established by way of the data network when the data throughput lies above the threshold value and is established by way of the communication-oriented telecommunication network when the data throughput lies below the threshold value.

BRIEF DESCRIPTION OF THE DRAWINGS

The invention will be explained below in two exemplary embodiments in conjunction with the drawings.

DETAILED DESCRIPTION OF PREFERRED EMBODIMENTS

A fundamental concept of the invention lies in preferably using a packet-switched data network, for example the Internet, for a call connection since lower rates are charged for this. However, if a call connection in the data network is not possible or is only possible with poor quality, e.g. due to overloading, the call connection is established by way of a connection-oriented communication network. A monitoring device, which determines the current data throughput to the desired calling partner by way of the data network, serves to determine the achievable call quality in the data network. If this data throughput lies below a predetermined threshold value, then the call connection is established by way of the communication network in which a transmission channel with a predetermined transmission bandwidth is guaranteed. The communication network can, for example, be an open telephone network operating in accordance with the ISDN standard, which has a guaranteed transmission rate of 64 kBit/s per B channel. Packet-switched data networks are also called connectionless networks, in contrast to connection-oriented networks like the conventional digital or analog telephone networks.

Figure 1:
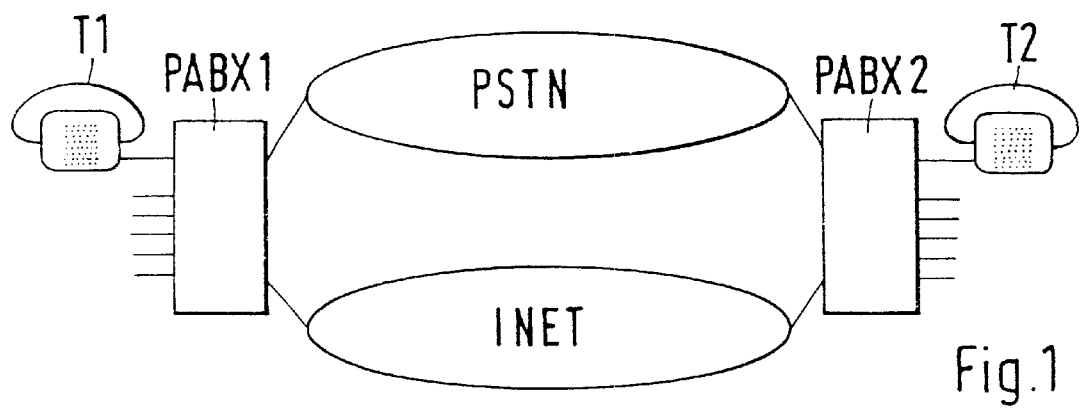
FIG. 1 shows a diagram for explaining the use of the device according to the invention, in a first exemplary embodiment.

The use of a device according to the invention for establishing the call connection in a first exemplary embodiment is shown in FIG. 1. Two subscriber terminals T1 and T2, for example analog or digital telephone sets, are each connected by way of a telecommunication system PABX (PABX: private automatic branch exchange) to both the Internet INET and an open telephone network PSTN (PSTN: public switch telephone network). A call connection from a calling subscriber terminal T1 to a called subscriber terminal T2 can therefore be established by way of the Internet as well as by way of the open telephone network. In the first exemplary embodiment, the device according to the invention is integrated into the first telecommunication system PABX1. Telecommunication systems are frequently also referred to as private automatic branch exchanges.

Figure 2:
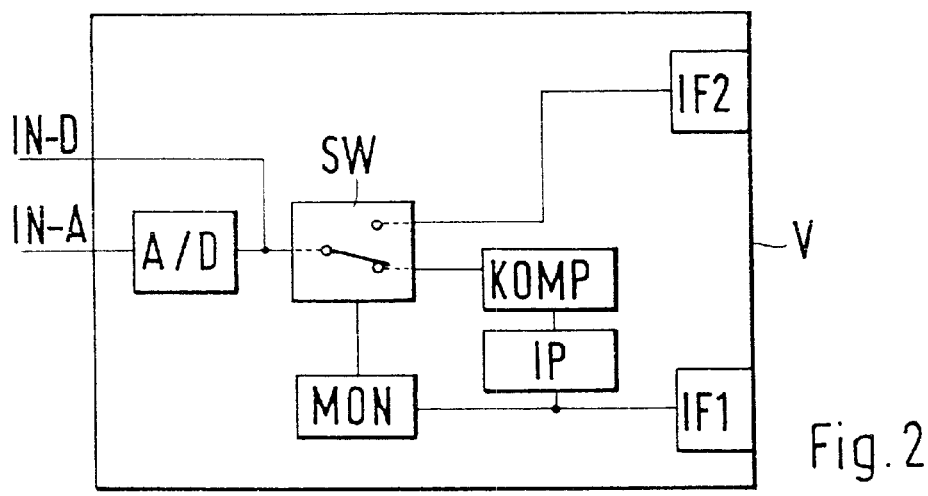
FIG. 2 shows a block circuit diagram of the device according to the invention.

The block circuit diagram in FIG. 2 clarifies the design and function of the device V according to the invention. The device V has a first interface IF1 to the Internet and a second interface IF2 to the open telephone network. An interface is understood to mean interface devices or interface circuits which can be connected to the respective network and carry out an adaptation of the electrical properties to the requirements of the respective network or also carry out an adaptation of the protocols used upstream and downstream of the respective interfaces. The first interface IF1 is connected to the monitoring device MON. This determines the data throughput in the Internet, for example by sending test signals of varying lengths to the called subscriber terminal or to another point in the network and determines the response times of the opposing location, as is customary on the Internet in the method known as PING.

In the first exemplary embodiment, the device V has two inputs IN-A and IN-D for the connection of the subscriber terminal. The first input IN-D is used to connect digital telephone sets, the second input IN-A is used to connect analog ones. The second input is therefore followed by an analog/digital converter, which, from an analog input signal, generates a digital signal, for example a PCM signal (PCM: pulse code modulation) of the type described in "Digitales Vermittlungssystem" [Digital Switching System] EWDS, Telekom Unterrichtsblätter [Telecom Education Pamphlets] year 46 2/1993 pp. 48–51.

The current data throughput, which has been determined by the monitoring device, is compared to a predetermined threshold value in a control device SW. If the data throughput lies above the threshold value, then the control device initiates the establishment of the connection by way of the Internet.

How the establishment of the connection occurs by way of the Internet is described in detail, for example, in the article by Dirk Reusch cited at the beginning. An IP address is determined from the telephone number of the called subscriber terminal, for example by means of a request in a central server. The digital speech signals are compressed by a compression device KOMP and sent to a packeting device IP. This packs the speech data into packets structured in accordance with the internet protocol (IP), adds the IP addresses of the sender and receiver, and sends the packets onto the Internet. There, they are sent in a packet-switched manner to the receiver, for example a gateway or an IP-capable telecommunication system to which the called subscriber terminal is connected.

If the Internet is overloaded, an interruption-free call connection is not possible. The data throughput then lies below the predetermined threshold value. In this instance, the control device initiates the establishment of the call connection by way of the open telephone network, where an interruption-free call connection is always possible, but at higher rates. The control device therefore logically has the function of a changeover between the Internet and the open telephone network.

It turns out to be advantageous to periodically or even continuously monitor the data throughput in the Internet during a call by means of the monitoring device. If the data throughput falls below the predetermined threshold value, which leads to reduced transmission quality, then parallel to an existing connection by way of the Internet, a second call connection is established by way of the open telephone network. After this parallel connection has been established, the existing call is changed over to the open telephone network by the control device.

Before the changeover a signaling between the two terminals preferably takes place, with the aid of which an arrangement regarding the changeover is made between the terminals, i.e. an arrangement regarding the execution of the changeover and its time.

Also for the case in which the call connection has been established by way of the telephone network because the data throughput lies below the threshold value, a continuous monitoring of the current data throughput is useful in order to move over to the less expensive Internet when the data throughput once more lies above the threshold value.

In order to prevent changeovers from occurring too frequently during a call, there are the following possibilities, which can also be combined: a changeover only occurs when the current data throughput exceeds or falls below the threshold value by at least a predetermined difference value, or the current data throughput is integrated, in the measurement, with a predetermined time constant, i.e. respectively by means of a predetermined time span. An excessively frequent changing over could lead to an overall higher charge since charges apply for each new connection establishment in the open telephone network.

In the exemplary embodiment, the threshold value is set to 6.5 kBit/s and the difference value, by which at least the current data throughput must fall below the threshold value so that the changeover to the open telephone network is triggered, comes to 0.5 kBit/s. This choice makes it possible for a standard compression method (ITU-T G723.1) to be used for the voice encoding, which produces data streams with 5.3 or 6.3 kBit/s. The threshold value can also be fixed at 5.5 kBit/s. Then the standardized voice encoding for 5.3 kBit/s can be used.

According to the invention, conference connections from one calling subscriber terminal to a number of called subscriber terminals can also be established by way of the open telephone network or by way of the Internet, depending on the data throughput in the Internet. Also, part of the called subscriber terminals can simultaneously be reached by way of call connections in the Internet and the remaining part can be reached by way of call connections in the open telephone network. Consequently, there is the advantage that for a conference connection, a bridge can be produced between the two networks, by means of which called subscribers can be included that can be reached either only by way of the Internet, or only by way of the open telephone network. The same is also possible for a call forwarding from one network into the other.

Figure 3:
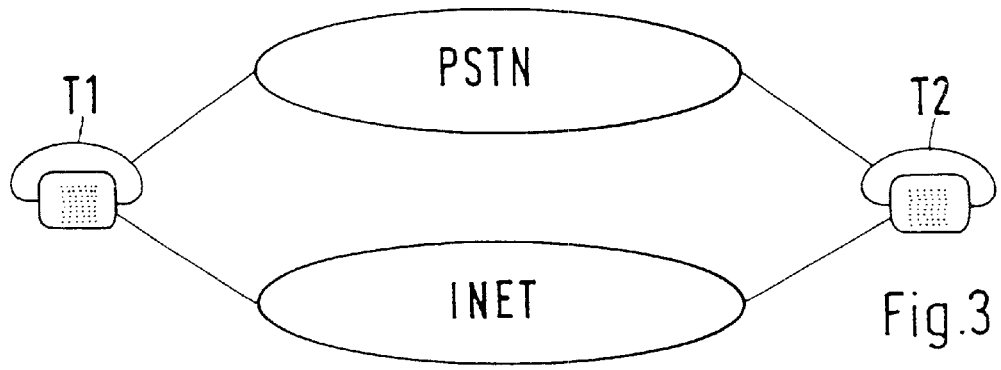
FIG. 3 shows a second exemplary embodiment of the invention.

A second exemplary embodiment of the invention is shown in FIG. 3. The Fig. shows two subscriber terminals T1, T2 that are respectively connected to the open telephone network PSTN and the Internet INET. A device according to the invention is integrated into each of the subscriber terminals T1, T2. Depending on the current data throughput in the Internet, therefore, a call connection from a calling subscriber terminal T1 to a called subscriber terminal T2 is established according to the method explained above either by way of the Internet or by way of the open telephone network.

The second subscriber terminal T2 does not have to be a device of the same type as T1, as shown in FIG. 3. Rather a combination of the devices shown in FIGS. 1 and 3 is possible, i.e. a subscriber terminal of the type shown in the second exemplary embodiment calls a subscriber terminal connected to a telecommunication system of the first exemplary embodiment. Naturally, subscriber terminals can also be called that can only be reached by way of one network, either by way of the Internet or by way of the open telephone network. The possibility of changing over is not applicable in this instance.

The two interfaces IF1, IF2 to the two networks PSTN, INET can also be identically formed, for example as $S_0$-interfaces of the ISDN. If there is a connect request to a called subscriber terminal, a connection to an internet provider, which can be reached at the local rate, for example, is produced by way of the first interface IF1 by means of the first B channel. Through the internet provider, the attempt is now made to establish a call connection on the Internet. If the data throughput in the Internet lies below the threshold value, the call connection is established in parallel in the open telephone network by way of the second B channel of the ISDN, which is connected to the second interface IF2.

An advantageous improvement is comprised in always establishing a call connection by means of the control device by way of the open telephone network, depending on other criteria. These other criteria can, for example, be that the called subscriber terminal cannot be reached by way of the Internet. This criterion can, for example, be determined from the telephone number and by means of an exclusion list stored in a memory of the control device. Another criterion can be the telephone number itself, by means of which it can be recognized whether the called subscriber is located in the same or a neighboring area code. In this instance, a call connection by way of the open telephone network would usually be less expensive than one by way of an internet provider. A further criterion can be the time of day at which a call is intended to be made. With the aid of a rate table, it can turn out that at particular times of day, it is likewise less expensive to establish a call connection not by way of the Internet, but by way of the open telephone network.

In this improvement, the control device tests whether a predetermined condition with regard to one or more other criteria has been fulfilled. Upon fulfillment of the condition, the establishment of the connection is then always carried out by way of the open telephone network. The predetermined condition for a subscriber from the area code 0711 with the neighboring area code 07152 could, for example, be: If [the area code of the telephone number is 0711 OR 07152] OR if [the area code begins with 07 AND the current time of day is between 18:00 and 9:00], then always establish the connection by way of the open telephone network (square brackets are used for the logical terms of the condition).

Another packet-switched data network in which the invention can be advantageously used is an intranet of the kind operated on an in-house basis by large companies.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A device (V) for establishing a call connection between at least two subscriber terminals (T1, T2), which has a first interface (IF1) to a packet-switched data network (INET) and means (IP, KOMP) for establishing connections by way of the packet-switched data network (INET), characterized by means of a second interface (IF2) to a connection-oriented telecommunication network (PSTN), in which a transmission channel with a set transmission band width can be furnished, a monitoring device (MON) for determining a current data throughput in the data network (INET), a control device (SW) for comparing the current data throughput with a set threshold value and for controlling the establishment of connections in such a way that the call connection is established by way of the data network (INET) when the data throughput lies above the threshold value and is established by way of the telecommunication network (PSTN) when the data throughput lies below the threshold value.

2. The device according to claim 1, in which the monitoring device (MON) repeatedly detects a current data throughput in the data network and the control device (SW) controls the establishment of connections during a call in such a way that an existing call connection established by way of the data network (INET) is re-established by way of the telecommunication network (PSTN) when the current data throughput lies below the threshold value.

3. The device according to claim 1, in which the monitoring device (MON) repeatedly detects a current data throughput in the data network (INET) and the control device (SW) controls the establishment of connections during a call in such a way that an existing call connection established by way of the telecommunication network (PSTN) is re-established by way of the data network (INET) when the current data throughput lies above the threshold value.

4. The device according to claim 2, in which the control device (SW) controls the establishment of connections in such a way that a new establishment of connection by way of the telecommunication network (PSTN) only occurs when the current data throughput falls below the threshold value by at least a predetermined difference value.

5. The device according to claim 3, in which the control device (SW) controls the establishment of connections in such a way that a new establishment of connection by way of the data network (INET) only occurs when the current data throughput exceeds the threshold value by at least a predetermined difference value.

6. The device according to claim 2, in which the current data throughput is integrated with a predetermined time constant before the comparison with the threshold value.

7. The device according to claim 1, in which the control device (SW) controls the establishment of connections using a criterion based on comparing the current data throughput with the set threshold value and also using at least one other criterion in such a way that a call connection is always established by way of the communication network (PSTN) when a predetermined condition is fulfilled with regard to the at least one other criterion.

8. A subscriber terminal (T1) in which two channels to a digital, connection-oriented communication network (PSTN) can be furnished in parallel, characterized in that it contains a device (V) for establishing a call connection between the subscriber terminal (T1) and another subscriber terminal (T2), the device (V) having a first interface (IF1) to a packet-switched data network (INET) and means (IP, KOMP) for establishing connections by way of the packet-switched data network (INET), the device (V) in turn characterized in that it includes:

- a second interface (IF2) to a connection-oriented telecommunication network (PSTN), in which a transmission channel with a set transmission band width can be furnished,
- a monitoring device (MON) for determining a current data throughput in the data network (INET),
- a control device (SW) for comparing the current data throughput with a set threshold value and for controlling the establishment of connections in such a way that the call connection is established by way of the data network (INET) when the data throughput lies above the threshold value and is established by way of the telecommunication network (PSTN) when the data throughput lies below the threshold value,
- wherein the first interface (IF1) and the second interface (IF2) are respectively connected to one of the two channels, and further wherein a connection to a provider of the packet-switched data network can be furnished by way of the channel connected to the first interface (IF1).

9. A telecommunications system (PABX1, PABX2) having a large number of connections for subscriber terminals (T1, T2), characterized in that it includes a subscriber terminal (T1) that in turn includes a device (V) for establishing a call connection between the subscriber terminal (T1) and another subscriber terminal (T2), the device (V) having a first interface (IF1) to a packet-switched data network (INET) and means (IP, KOMP) for establishing connections by way of the packet-switched data network (INET), the device (V) in turn characterized in that it includes:

- a second interface (IF2) to a connection-oriented telecommunication network (PSTN), in which a transmission channel with a set transmission band width can be furnished,
- a monitoring device (MON) for determining a current data throughput in the data network (INET),
- a control device (SW) for comparing the current data throughput with a set threshold value and for controlling the establishment of connections in such a way that the call connection is established by way of the data network (INET) when the data throughput lies above the threshold value and is established by way of the telecommunication network (PSTN) when the data throughput lies below the threshold value,
- wherein in providing at least one of the connections for the subscriber terminal (T1), the control device (V) couples either the first interface (IF1) or the second interface (IF2) to the subscriber terminal (T1).

10. A method for establishing a call connection from a calling subscriber terminal (T1), which is connected to a device (V) for establishing the call connection, to at least one called subscriber terminal (T2), with the following steps:

- connection of the calling subscriber terminal (T1) with a packet-switched data network (INET) by way of a first interface (IF1) of the device (V),
- connection of the calling subscriber terminal (T1) to a connection-oriented telecommunication network (PSTN), in which a transmission channel with a predetermined transmission band width can be furnished, by way of a second interface (IF2) of the device (V),
- determination of a current data throughput in the packet-switched data network (INET),
- comparison of the current data throughput with a predetermined threshold value, and
- control of the establishment of connections in such a way that the call connection is established by way of the data network (INET) when the data throughput lies above the threshold value and is established by way of the communication-oriented telecommunication network (PSTN) when the data throughput lies below the threshold value.

* * * * *